Patented Aug. 8, 1950

2,517,695

UNITED STATES PATENT OFFICE 2,517,695

PRODUCTION OF 1-ALKYL 4-PHENYL-PIPERIDYL 4-KETONES

Karl Miescher, Riehen, and Hans Kaegi, Basel, Switzerland, assignors to Ciba Pharmaceutical Products, Inc., Summit, N. J.

No Drawing. Application July 16, 1946, Serial No. 683,980. In Switzerland July 13, 1945

Section 1, Public Law 690, August 8, 1946
Patent expires July 13, 1965

13 Claims. (Cl. 260—294.7)

This invention relates to 4-aryl-piperidyl-(4)-ketones and to the preparation thereof.

The manufacture of 4-aryl-piperidyl-(4)-ketones by the reaction of 4-aryl-piperidine-(4)-carboxylic acid-nitriles with organic magnesium compounds is known. Our experiments have shown this process to be of no advantage in certain cases, for instance for the manufacture of 4-(ortho-oxy-phenyl)-piperidyl-(4)-ketones. There is advantage, however, in making these compounds by the new process explained below.

It has been found that piperidyl ketones are obtained if a metalloorganic compound is caused to act on a 4-aryl-piperidine-(4)-carboxylic acid ester, the reaction product is decomposed and the resultant 4-aryl-piperidyl-(4)-ketone is isolated. No formation of any tertiary alcohols could be observed in this connection. This is all the more surprising as the formation of such alcohols in the reaction of carboxylic acid esters with metalloorganic compounds is well known.

There may be used as starting materials esters of any 4-aryl-, such as 4-phenyl- or 4-naphthyl-piperidine-(4)-carboxylic acids with any hydroxy compounds of alcoholic or phenolic character. They may also carry substituents, for instance, alkyls or aralkyls in the piperidine ring and free, etherified or esterified hydroxyl groups, like alkoxy-, aralkoxy- or acyloxy groups, in the aryl radical. Above all, there may be used lactones, such as are formed by intramolecular esterification with a hydroxy group in ortho-position of the aryl nucleus. Examples thereof are: 1-methyl-, 1-ethyl- or 1-benzyl-4-phenyl-piperidine-(4)-carboxylic acid-methyl-, ethyl-, -propyl-, or -phenyl-ester, 1:2-dimethyl-4-phenyl-piperidine-(4)-carboxylic acid-ethyl-ester, 1-methyl-, 1-ethyl- or 1-benzyl-4-(meta-methoxy-phenyl)-, -(meta-benzyloxy-phenyl)-, -(meta-acetoxy-phenyl)- or -(meta-benzoyloxy-phenyl)-piperidine-(4)-carboxylic acid-ethyl- or -phenyl-ester, 1-methyl-, 1-ethyl-, 1-propyl-, 1-allyl- or 1-benzyl-4-(ortho-oxy-phenyl)-piperidine-(4)-carboxylic acid-γ-lactone or 1-methyl-, 1-ethyl-, 1-propyl-, 1-allyl-, 1-benzyl-4-(ortho:meta-dioxy-phenyl)-piperidine-4-carboxylic acid-γ-lactone and the like. These esters may as well be used in the form of their salts. The lactones mentioned are obtained, for instance, by hydrolysis of the corresponding oxy-carboxylic acid-nitriles. Those of the nitriles or the other esters which may not be known may be produced by the processes described in U. S. Patent applications, Serial No. 530,742, filed April 12, 1944, now Patent 2,486,792; No. 534,800, filed May 9, 1944, now Patent 2,486,793; No. 592,535, filed May 7, 1945, now Patent 2,486,794; and No. 592,536, filed May 7, 1945, now Patent 2,486,795.

Metalloorganic compounds which may be used are, for instance, compounds of the Grignard type, i. e. organic metallic halide compounds, such as organic metallic chloride, metallic bromide or metallic iodide compounds, especially those of magnesium, furthermore those of zinc and cadmium, for instance; moreover, alkali metalloorganic compounds, such as those of sodium, potassium and lithium. The organic radicals in these compounds may be of aliphatic, alicyclic, aromatic or araliphatic character, such as, for example, methyl-, ethyl-, propyl-, butyl-, allyl-, cyclohexyl-, phenyl- or benzyl radicals. The reaction of these metalloorganic compounds may take place in the presence or absence of diluents, such as ether, anisol, dioxane, or toluene. Depending upon the reaction components, cooling, or ordinary or raised temperature is necessary.

The product obtained in the above reaction is decomposed with, for instance, water, ammonium chloride solution, or diluted acids. The ketone formed may be isolated in the form of the base or one of its salts. When the resultant ketones contain phenolic hydroxyl groups, there are formed by the decomposition with water metal phenolates, such as, for instance, magnesium, sodium or lithium phenolates. From them, the free bases may be separated through the addition of ammonium salts, and they may be isolated by suction-filtering or by taking up in a solvent, depending upon their physical constitution. If the hydroxyketones form difficultly soluble salts with acids, the phenolates may as well be decomposed by acids and the precipitated salts may be separated.

If esters with substituted or free hydroxyl groups are used as starting materials, the resultant ketones may be treated with hydrolysing and/or etherifying or esterifying agents.

The 4-aryl-piperidyl-(4)-ketones obtained by the instant process are therapeutically valuable compounds. They may be used as medicaments or as intermediates. The hitherto unknown 1-methyl-4-(ortho-hydroxy-phenyl)-piperidyl-(4)-methyl-ketone, for instance, has a very good analgetic effect.

The following examples illustrate the invention, but are not to be regarded as limiting it in any way, the relationship of the parts by weight to parts by volume being the same as that of the gram to the cubic centimeter:

Example 1

1 part by weight of the 1-methyl-4-(ortho-methoxy-phenyl)-piperidine-(4)-carboxylic acid-nitrile is dissolved in 4 parts by volume of 10 N-hydrobromic acid and the solution is boiled in a reflux apparatus for 6 hours. Upon cooling, the hydrobromide of the lactone of the 1-methyl-4-(ortho-oxy-phenyl)-piperidine-(4)-carboxylic acid crystallizes. It is separated by suction-filtering and then recrystallized from water. By evaporating the hydrobromic acid, another quantity of the substance may be obtained. The yield amounts to more than 80 per cent. of the theoretical yield. From the aqueous solution the lactone is precipitated as an oil by means of weak alkalis; it boils at 103° C. under 0.06 mm. pressure; strong alkalis split it up into the hydroxy acid.

7.2 parts by weight of magnesium are reacted under 100 parts by volume of absolute ether by running in methyl bromide to form the Grignard compound. After the addition of another 100 parts by volume of ether, 100 parts are distilled off in order to remove any excess of methyl bromide. There follows cooling with ice and 29.8 parts by weight of the finely powdered lactone-hydrobromide of the 1-methyl-4-(ortho-oxyphenyl)-piperidine-(4)-carboxylic acid is then added in small portions. Finally, there follows boiling in a reflux apparatus for 15 minutes. Small lumps of ice are added until the magnesium compound is decomposed and until the ether is distinctly separated. The latter is poured off; it leaves no residue when evaporated. The magnesium sludge is mixed with hydrobromic acid until it gives an acid reaction, while the hydrobromide of the 1-methyl-4-(ortho-hydroxyphenyl)-piperidyl-(4)-methyl-ketone separates. It is removed by suction-filtering and can be recrystallized from absolute alcohol. The salt is easily soluble in water and has a somewhat vague melting point of about 190–200° C. Upon the addition of ammonia to the aqueous solution the base precipitates as a solid body. It is rather difficultly soluble in ether and can be recrystallized from ethyl acetate. It has a tendency to retain some of the solvent and must be dried under reduced pressure at a temperature of at least 100° C. The thus prepared base often has two melting points, one at 128–129.5° C. and the other at 154.5–156° C. The first is often hardly noticeable or even inexistent. The base can rather easily be sublimated under greatly reduced pressure at about 150° C.

Instead of acidifying the magnesium sludge with hydrogen bromide and isolating the hydrobromide of the hydroxy ketone, one may decompose it with ammonia and ammonium chloride. The separated base may be removed by suction-filtering and recrystallized from ethyl acetate after drying.

Instead of the lactone-hydrobromide, the free lactone, preferably in ethereal solution, may be reacted with the Grignard salt. In this case, there was needed 21.7 parts by weight of the base, which correspond to the above indicated quantity of the hydrobromide, and only half the quantity of the Grignard compound, namely that obtained from 3.6 parts by weight of magnesium. A good yield is obtained in all these cases and it amounts to more than 80 per cent. of the calculated yield.

By reacting, instead of methyl magnesium bromide, an ethyl-, propyl-, or benzyl magnesium halide, the 1-methyl-4-(ortho-hydroxy-phenyl)-piperidyl-(4)-ethyl-ketone, or the 1-methyl-4-(ortho-hydroxy-phenyl)-piperidyl-(4)-propyl-ketone, or the 1-methyl-4-(ortho-hydroxy-phenyl)-piperidyl-(4)-benzyl-ketone, respectively, and their salts are obtained in similar manner.

Through the treatment of the above hydroxy ketones with esterifying agents, there are obtained the corresponding acyloxy-ketones, for example from 1-methyl-4-(ortho-hydroxy-phenyl)-piperidyl-(4)-methyl-ketone and acetic acid anhydride the 1-methyl-4-(ortho-acetoxyphenyl)-piperidyl-(4)-methyl-ketone, the hydrochloride of which melts at 228.5–232° C. By the treatment of the hydroxy-ketones with alkylating agents, the alkoxy compounds may be prepared, such as, for instance, the 1-methyl-4-(ortho-methoxy-phenyl)-piperidyl-(4)-methyl-ketone boiling at 130–135° C. under 0.1 mm. pressure.

*Example 2*

2.4 parts by weight of magnesium are reacted in 50 parts by volume of absolute ether with 14.2 parts by weight of methyl iodide. After the addition of 14 parts by weight of 1-methyl-4-(meta-methoxy-phenyl)-piperidine-(4)-carboxylic acid ethyl ester, which causes but a slight reaction, the greater part of the ether is distilled off and replaced by 50 parts by volume of toluene. The whole is heated for several hours on a water bath. A crust separates which, after cooling, is dissolved by the addition of dilute hydrochloric acid. The toluene is separated, ammonia is mixed with the hydrochloric acid solution, followed by extraction with ether. The ether residue represents the 1-methyl-4-(meta-methoxy-phenyl)-piperidyl-(4)-methyl-ketone which distills at 122–129° C. (0.05 mm. pressure) and which is obtained in the form of an oil.

When the thus obtained methoxy compound is boiled for one hour with concentrated hydrobromic acid, the methoxy group is split up and upon the addition of ammonia the 1-methyl-4-(meta-hydroxy-phenyl)-piperidyl-(4)-methyl-ketone precipitates and is recrystallized from alcohol. It has two melting points, 158–159° C. and 177–178° C.

Instead of the 1-methyl-4-(meta-methoxy-phenyl)-piperidine-(4)-carboxylic acid ethyl ester another ester, such as, for example, the methyl-, propyl-, or benzyl-ester can be used as starting material.

*Example 3*

15 parts by weight of powdered 1-methyl-4-(ortho-oxy-phenyl)-piperidine-(4)-carboxylic acid-lactone-bromohydrate (or an ethereal solution of the corresponding quantity of the free lactone) are added in portions while stirring and cooling with ice to a solution of butyl-lithium made from 2.1 parts by weight of lithium and 14 parts by weight of n-butyl-chloride in 150 parts by volume of absolute ether. The mass is stirred for another 30 minutes at room temperature and a further 15 minutes while boiling in a reflux apparatus and then decomposed with ice. By the addition of ammonium chloride the oxyketone which has formed and which is present in the aqueous layer as lithium salt, is freed and goes to the ether layer. The latter is separated and evaporated. The 1-methyl-4-(ortho-hydroxy-phenyl)-piperidyl-(4)-n-butyl-ketone remains behind as a glassy resin which does not crystallize. From a solution of this base in ethyl acetate a crystalline hydrochloride may be obtained by means of alcoholic hydrochloric acid which hydrochloride melts at approx. 171–176° C. and is easily soluble in water.

The following compounds may be prepared in a manner analogous to the ones indicated in the above examples:

1-methyl-4-phenyl-piperidyl-(4)-methylketone-hydrochloride, melting point 240–242° C.;
1-methyl-4-phenyl-piperidyl-(4)-ethylketone, boiling point 158–160° C. under 10 mm. pressure;

1-ethyl-4-phenyl-piperidyl-(4)-ethylketone, boiling point 100° C. under 0.1 mm. pressure;

1-methyl-4-(meta-methoxy - phenyl) - piperidyl-(4) - n - propylketone-hydrochloride, melting point 125–127° C.;

1-methyl-4-(meta-hydroxy - phenyl) - piperidyl-(4)-n-propylketone, melting point 153–154° C.;

1-methyl-4-(meta- acetoxy - phenyl) - piperidyl-(4) - n - propylketone - hydrochloride, melting point 174–175° C.;

1-methyl-4-(meta-hydroxy - phenyl) - piperidyl-(4)-benzylketone, melting point 187–188° C.

Having thus disclosed the invention, what we claim is:

1. A process of preparing a piperidyl ketone, which comprises reacting, under anhydrous and neutral conditions, a compound selected from the group consisting of alkyl magnesium halides and alkyl-alkali metal compounds with a 1-lower - alkyl-4-phenyl-piperidine- (4)-carboxylic acid ester, decomposing the reaction product, and isolating the resultant 1-lower-alkyl-4-phenyl-piperidyl-(4)-ketone.

2. A process of preparing a piperidyl ketone, which comprises reacting, under anhydrous and neutral conditions, a compound selected from the group consisting of alkyl magnesium halides and alkyl-alkali metal compounds with a 1-lower - alkyl-4-phenyl-piperidine- (4)-carboxylic acid ester whose phenyl nucleus carries a member selected from the group consisting of free, esterified and etherified hydroxyl groups, decomposing the reaction product, and isolating the resultant 1-lower-alkyl-4-phenyl-piperidyl-(4)-ketone.

3. A process of preparing a piperidyl ketone, which comprises reacting, under anhydrous and neutral conditions, an alkyl-alkali metal compound with a 1-lower-alkyl-4-phenyl-piperidine-(4)-carboxylic acid ester, decomposing the reaction product, and isolating the resultant 1-lower-alkyl-4-phenyl-piperidyl-(4)-ketone.

4. A process of preparing a piperidyl ketone, which comprises reacting, under anhydrous and neutral conditions, an alkyl-alkali metal compound with a 1-lower-alkyl-4-phenyl-piperidine-(4)-carboxylic acid ester whose phenyl nucleus carries a member selected from the group consisting of free, esterified and etherified hydroxyl groups, decomposing the reaction product, and isolating the resultant 1-lower-alkyl-4-phenyl-piperidyl-(4)-ketone.

5. A process of preparing a piperidyl ketone, which comprises reacting, under anhydrous and neutral conditions, an alkyl magnesium halide with a 1-lower-alkyl-4-phenyl-piperidine-(4)-carboxylic acid ester, decomposing the reaction product, and isolating the resultant 1-lower-alkyl-4-phenyl-piperidyl-(4)-ketone.

6. A process of preparing a piperidyl ketone, which comprises reacting, under anhydrous and neutral conditions, an alkyl magnesium halide with a 1-lower-alkyl-4-phenyl-piperidine-(4)-carboxylic acid ester, whose phenyl nucleus carries a member selected from the group consisting of free, esterified and etherified hydroxyl groups, decomposing the reaction product, and isolating the resultant 1-lower-alkyl-4-phenyl-piperidyl-(4)-ketone.

7. A process of preparing a piperidyl ketone, which comprises reacting, under anhydrous and neutral conditions, a compound selected from the group consisting of alkyl magnesium halides and alkyl-alkali metal compounds with a 1-lower-alkyl-4-(ortho-oxy-phenyl)-piperidine-(4)-carboxylic acid lactone, decomposing the reaction product, and isolating the resultant 1-lower-alkyl-4-phenyl-piperidyl-(4)-ketone.

8. A process of preparing a piperidyl ketone, which comprises reacting, under anhydrous and neutral conditions, an alkyl-alkali metal compound with a 1-lower-alkyl-4-(ortho-oxy-phenyl)-piperidine-(4)-carboxylic acid lactone, decomposing the reaction product, and isolating the resultant 1-lower-alkyl-4-phenyl-piperidyl-(4)-ketone.

9. A process of preparing a piperidyl ketone, which comprises reacting, under anhydrous and neutral conditions, an alkyl magnesium halide with a 1-lower-alkyl-4-(ortho-oxy-phenyl)-piperidine-(4)-carboxylic acid lactone, decomposing the reaction product, and isolating the resultant 1-lower-alkyl-4-phenyl-piperidyl-(4)-ketone.

10. A process of preparing a piperidyl ketone, which comprises reacting, under anhydrous and neutral conditions, a methyl magnesium halide with the 1-methyl-4-(ortho-hydroxy-phenyl)-piperidine-(4)-carboxylic acid lactone, decomposing the reaction product, and isolating the resultant 1-methyl-4-(ortho-hydroxy-phenyl)-piperidyl-(4)-methyl-ketone.

11. A process of preparing a piperidyl ketone, which comprises reacting, under anhydrous and neutral conditions, n-butyl-lithium with the 1-methyl - 4 - (ortho-hydroxy-phenyl)-piperidine-(4)-carboxylic acid lactone, decomposing the reaction product, and isolating the resultant 1-methyl-4-(ortho-hydroxy-phenyl)-piperidyl-(4)-n-butyl-ketone.

12. A proces of preparing a piperidyl ketone, which comprises reacting, under anhydrous and neutral conditions, an alkyl magnesium halide with a 1-lower-alkyl-4-(meta-alkoxy-phenyl)-piperidine-(4)-carboxylic acid ester, decomposing the reaction product, and isolating the resultant 1-lower-alkyl-4-phenyl-piperidyl-(4)-alkyl ketone.

13. A process of preparing a piperidyl ketone, which comprises reacting, under anhydrous and neutral conditions, methyl magnesium halide with a 1 - methyl - 4 - (meta - methoxy - phenyl) - piperidine - (4) - carboxylic acid ethyl ester, decomposing the reaction product, and isolating the resultant 1-methyl-4-(meta-methoxy-phenyl)-piperidyl-(4)-methyl ketone.

KARL MIESCHER.
HANS KAEGI.

REFERENCES CITED

The following references are of record in the file of this patent:

UNITED STATES PATENTS

| Number | Name | Date |
|---|---|---|
| 2,167,351 | Eisleb | July 25, 1939 |
| 2,248,018 | Eisleb | July 1, 1941 |
| 2,411,664 | Miescher et al. | Nov. 26, 1946 |
| 2,418,289 | Bergel et al. | Apr. 1, 1947 |

FOREIGN PATENTS

| Number | Country | Date |
|---|---|---|
| 169,819 | Germany | Apr. 2, 1906 |
| 682,876 | Germany | Oct. 24, 1939 |

OTHER REFERENCES

Schaumann Archiv fur Exp. Path. Pharm., vol. 196, pages 127–129.

Bergel et al., II Chem. Abstracts, vol. 38, pp. 5829–5830 (1944).

Bergel et al., (II) Jour. Chem. Soc. (London) (1944), pages 262–264.

Certificate of Correction

Patent No. 2,517,695                                                          August 8, 1950

KARL MIESCHER ET AL.

It is hereby certified that error appears in the printed specification of the above numbered patent requiring correction as follows:

Column 3, line 55, for the word "was" read *are*; column 6, in the list of references cited, under the heading "FOREIGN PATENTS", add the following:

218,517    Switzerland_____Apr. 1, 1942 and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*